US011080238B2

(12) United States Patent
Zwiefelhofer et al.

(10) Patent No.: US 11,080,238 B2
(45) Date of Patent: Aug. 3, 2021

(54) SYSTEM AND METHOD FOR INTERACTIVE VISUAL REPRESENTATION OF METADATA WITHIN A NETWORKED HETEROGENEOUS WORKFLOW ENVIRONMENT

(71) Applicant: World Software Corporation, Glen Rock, NJ (US)

(72) Inventors: Ray W. Zwiefelhofer, Tempe, AZ (US); Rob A. Oriolo, Budd Lake, NJ (US)

(73) Assignee: World Software Corporation, Glen Rock, NJ (US)

( * ) Notice: Subject to any disclaimer, the term of this patent is extended or adjusted under 35 U.S.C. 154(b) by 37 days.

(21) Appl. No.: 16/381,852

(22) Filed: Apr. 11, 2019

(65) Prior Publication Data

US 2020/0042498 A1 Feb. 6, 2020

Related U.S. Application Data

(60) Provisional application No. 62/712,726, filed on Jul. 31, 2018.

(51) Int. Cl.
*G06F 16/93* (2019.01)
*G06F 16/16* (2019.01)
*G06F 16/25* (2019.01)

(52) U.S. Cl.
CPC .......... *G06F 16/168* (2019.01); *G06F 16/166* (2019.01); *G06F 16/252* (2019.01); *G06F 16/93* (2019.01)

(58) Field of Classification Search
CPC ...... G06F 16/168; G06F 16/93; G06F 16/252; G06F 16/166
See application file for complete search history.

(56) References Cited

U.S. PATENT DOCUMENTS

| | | | |
|---|---|---|---|
| 7,647,349 B2 | 1/2010 | Hubert et al. | |
| 7,720,436 B2 | 5/2010 | Hamynen et al. | |
| 8,483,712 B2 * | 7/2013 | Hamynen | G06F 3/147 |
| | | | 455/456.1 |
| 9,128,939 B2 | 9/2015 | Kinsella | |
| 9,350,774 B2 | 5/2016 | Kaplan | |
| 9,697,203 B2 | 7/2017 | Grossman et al. | |
| 9,782,138 B2 | 10/2017 | Koehler et al. | |

(Continued)

*Primary Examiner* — Anil K Bhargava
(74) *Attorney, Agent, or Firm* — Scott Griggs; Griggs Bergen LLP

(57) ABSTRACT

A system and method for interactive visual representation of metadata within a networked heterogeneous workflow environment is disclosed. In one embodiment of the system, a document management server is configured to provide an enterprise environment having storage, versioning, metadata, security, indexing, and retrieval of a multitude of files having various users. Geolocation metadata includes information used to identify a subject physical location relevant to each file. Geolocation data includes information used to identify a physical location of a geo-location computing device in communication with the document management system. The document management server generates predictive geo-relevant metadata by evaluating the geolocation metadata associated with the files and the geolocation data received from the geolocation-enabled computing device.

20 Claims, 3 Drawing Sheets

(56) References Cited

U.S. PATENT DOCUMENTS

| | | | |
|---|---|---|---|
| 10,372,772 B2* | 8/2019 | Brodie | G06F 16/168 |
| 2004/0133589 A1* | 7/2004 | Kiessig | G06F 16/10 |
| 2009/0030948 A9* | 1/2009 | Lipman | G06F 16/93 |
| 2013/0012237 A1* | 1/2013 | Hamynen | H04N 21/4722 |
| | | | 455/456.3 |
| 2013/0086072 A1* | 4/2013 | Peng | G06F 16/9537 |
| | | | 707/743 |
| 2013/0110804 A1 | 5/2013 | Davis et al. | |
| 2013/0227026 A1* | 8/2013 | Jayaram | G06Q 30/0207 |
| | | | 709/205 |
| 2015/0127607 A1* | 5/2015 | Savage | G06F 16/178 |
| | | | 707/610 |
| 2015/0248391 A1 | 9/2015 | Watanabe | |
| 2015/0355889 A1 | 12/2015 | Kilby et al. | |
| 2016/0048500 A1 | 2/2016 | Hebert | |
| 2016/0170695 A1 | 6/2016 | Sakashita | |

\* cited by examiner

SYSTEM AND METHOD FOR INTERACTIVE VISUAL REPRESENTATION OF METADATA WITHIN A NETWORKED HETEROGENEOUS WORKFLOW ENVIRONMENT

PRIORITY STATEMENT & CROSS-REFERENCE TO RELATED APPLICATION

This application claims priority from co-pending U.S. Patent Application Ser. No. 62/712,726, entitled "System and Method for Interactive Visual Representation of Metadata within a Networked Heterogeneous Workflow Environment" and filed on Jul. 31, 2018, in the name of Ray Zwiefelhofer; which is hereby incorporated by reference for all purposes.

TECHNICAL FIELD OF THE INVENTION

This invention relates, in general, to the management and use of metadata that may be generated by software application systems and, in particular, to systems and methods for interactive visual representation of metadata within a networked heterogeneous workflow environment.

BACKGROUND OF THE INVENTION

Metadata is commonly used in various information technology (IT) systems to describe the informational content of various files and may include, for example, the name of a file, file type, or the name and length of particular data items. As a result, metadata may be employed to efficiently manage data leading to more convenience, efficiency, and productivity. Advances in computer software and techniques, however, are required to fully use metadata within networked heterogeneous workflow environments, including software applications, computing devices, and geolocation-enabled computing devices.

SUMMARY OF THE INVENTION

It would be advantageous to fully utilize metadata within networked heterogeneous workflow environments. It would also be desirable to enable a computer-based solution that would improve document management efficiency and effectiveness when geolocation-enabled computing devices, such as smart phones and the like, are interacting with the document management system. To better address one or more of these concerns, a system and method for interactive visual representation of metadata within a networked heterogeneous workflow environment are disclosed. In one embodiment of the system, a document management system (DMS) server is configured to provide an enterprise environment having a document management system furnishing storage, versioning, metadata, security, indexing, and retrieval of a multitude of files having various users. Geolocation metadata includes information used to identify a subject physical location relevant to each file. Geolocation data includes information used to identify a physical location of a geo-location computing device in communication with the document management system. The document management server generates predictive geo-relevant metadata by evaluating the geolocation metadata associated with the files and the geolocation data received from the geolocation-enabled computing device.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
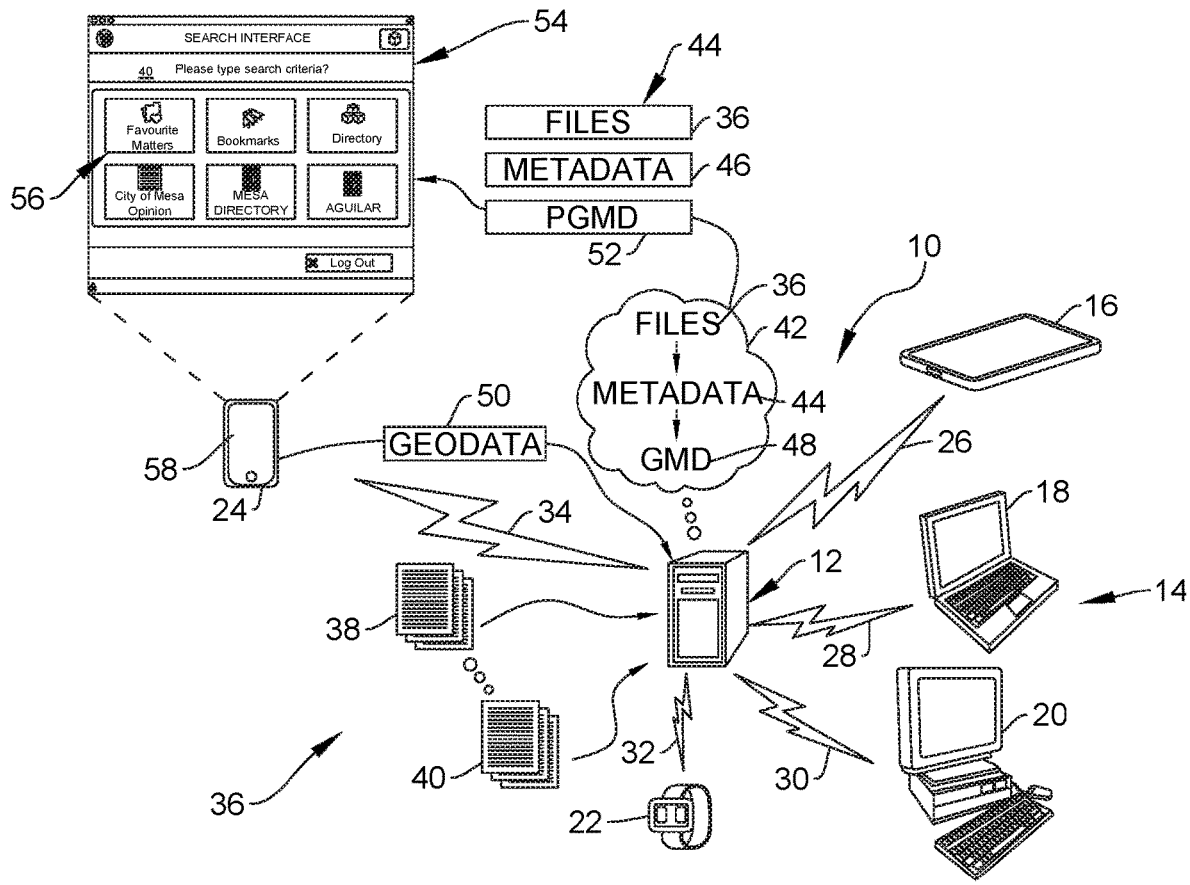
FIG. 1 is a schematic block diagram depicting one embodiment of a system for interactive visual representation of metadata within a networked heterogeneous workflow environment.

Referring initially to FIG. 1, therein is depicted one embodiment of a system for interactive visual representation of metadata within a networked heterogeneous workflow environment that is schematically illustrated and designated 10. A document management system (DMS) server 12 and multiple workflow computing devices 14, including a tablet computer 16, a laptop 18, a desktop computer 20, a smart watch 22, and smart phone 24, for example, are connected thereto via respective communication links 26, 28, 30, 32, 34 which may include networks such as the Internet or intranet, for example.

As shown, the DMS server 12 stores files 36 depicted as documents and document information 38, 40 created by various users utilizing the workflow computing devices 14. Moreover, the documents and document information 38, 40 stored in the DMS server 12 may be accessed from the respective workflow computing devices 14.

The DMS server 12 may include a document management system 42 that tracks and stores files. More particularly, the document management system 42 may provide storage, versioning, metadata, security, indexing, and retrieval capabilities. Storage may include management and document management functions such as where the files are stored, for how long, migration (if necessary) from one storage media to another, and eventual document destruction. Versioning may include managing a process by which documents are checked in or out of the document management system 42, allowing users to retrieve previous versions, or work from a selected point in time or place in the document. Security may include various file permissions and passwords, for example. Indexing may include tracking the files with unique document identifies and other techniques that support the file's rapid retrieval, which includes locating and opening the file.

In one exemplary embodiment, data 44 relative to the documents and document information 38, 40 stored in the DMS server 12 include the files 36, various metadata 46, which may include the date the document was stored and various identifying characteristics such as creator and subsequent modifiers. The metadata 46 may also include information about the contents and context of a file as well as information related to the indexing and other document management system 42 functions. For example, when files 36 and the metadata 46 is created by the respective workflow computing devices 14 and uploaded on the DMS server 12, in the present embodiment, geolocation metadata 48 is identified in the documents and document information 38, 40 to identify a subject physical location relevant to each of the files based on authors, audiences, topics, and copy, for example. In one implementation, the geolocation metadata 48 includes information used to identify a subject physical location such as addresses, cities, buildings, and places, for example. In response to receiving geolocation data 50 from a geolocation enabled computing device, such as one of the respective workflow computing devices 14, the DMS server generates predictive geo-relevant metadata 52 by referencing the geolocation data 50 against the geolocation metadata 48. By way of extensible software protocol that communicates with a third-party device, such as respective workflow computing devices 14, the DMS server 12, in response to a user login at the DMS server 12, provides the data 44, including predictive geo-relevant metadata 52. The data 44, in turn, is displayed on a graphical user interface of a display of the appropriate workflow computing devices 14 in a profile type presentation 56. As shown, the geolocation-enabled computing device of the workflow computing devices 14 is the smart phone 24 having a display 58.

The user navigates the profile type presentation 56 and selects the appropriate file, directory structure, or metadata container, for example, as will be explained in further detail in FIG. 5A. That is, a quickly accessible and interactive visual representation of the files 36 is created based on the geolocation data 50 associated with the workflow computing device 14 and the geolocation metadata 48 associated with the files 36. The interactive visual representation may be in the form of a shortcut or icon or logic tree. As a result, geolocation metadata 48 associated with a user's geolocation-enabled computing device may be employed to identify a user's location and predictively present data 44, including files 36, metadata 46, and geolocation metadata 48 having an association with the user's location. As a result, the leveraging of metadata 46 associated with files 36 and geolocation data 50 provides efficiently presented files leading to more convenience, efficiency, and productivity.

Figure 2:
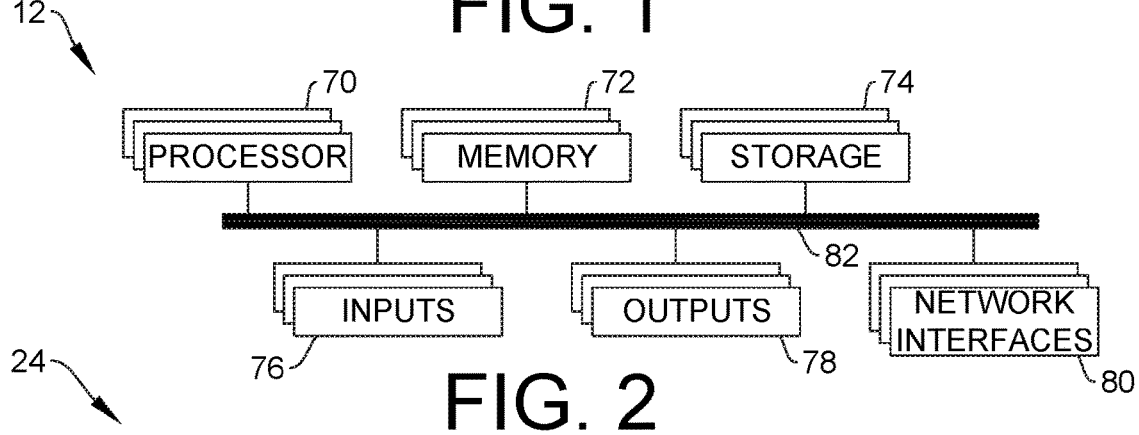
FIG. 2 is a schematic block diagram depicting one embodiment of a document management system (DMS) server shown in FIG. 1 in further detail.

Referring now to FIG. 2, a schematic block diagram is illustrated depicting the DMS server 12 in further detail. A computing device, which may be the DMS server 12 embodied as a web-based or cloud-based server, for example, includes a processor 70, memory 72, storage 74, inputs 76, outputs 78, and network interfaces 80 interconnected with various buses 82 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 70 may process instructions for execution within the computing device, including instructions stored in the memory 72 or in the storage 74. The memory 72 stores information within the computing device. In one implementation, the memory 72 is a volatile memory unit or units. In another implementation, the memory is a non-volatile memory unit or units. The storage 74 provides capacity that is capable of providing mass storage for the computing device. Various inputs 76 and outputs 78 provide connections to and from the computing device, wherein the inputs 76 are the signals or data received by the computing device, and the outputs 78 are the signals or data sent from the computing device. The network interfaces provide the computer and data connections to computer networks, including, for example, the various communication links 26, 28, 30, 32, 34.

As discussed, the memory 72 is accessible to the processor 70 and the memory 72 includes processor-executable instructions that, when executed, cause the processor 70 to evaluate the metadata 46 associated with the files 36 based on geolocation metadata 48 associated with the files 36. The processor-executable instructions may then cause the processor 70 to create, based on the evaluation, geolocation metadata 48 associated with each of the files 36. As previously discussed, the geolocation metadata 48 may include information used to identify a subject physical location relevant to each file.

The processor-executable instructions may then cause the processor 70 to receive a user login request from the geolocation-enabled computing device originated by a user at the geolocation-enabled computing device and then receive geolocation data 50 from the geolocation-enabled computing device. As previously mentioned, the geolocation data 50 may be information used to identify a physical location of the geo-location computing device. The processor-executable instructions may cause the processor 70 to generate predictive geo-relevant metadata 52 by referencing the geolocation data 50 against the geolocation metadata 48 by, for example, utilizing a proximity threshold to compare the geolocation data 50 and the geolocation metadata 48. In one implementation, the predictive geo-relevant metadata 52 is a subset of the geolocation metadata associated with the geo-location enabled computing device.

In one implementation, the memory 72 including processor-executable instructions to generate predictive geo-relevant metadata 52 may further include processor-executable instructions that, when executed, cause the processor 70 to utilize a proximity distance-based threshold to compare the geolocation data 50 and the geolocation metadata 48 to list all relevant files having geolocation metadata 48 within a specified distance from the geolocation data 50. In another implementation the memory 72 including processor-executable instructions to generate predictive geo-relevant metadata 52 may further include processor-executable instructions that, when executed, cause the processor 70 to utilize a proximity distance-based threshold to compare the geolocation data 50 and the geolocation metadata 48 to list a specified relevant file having the closest geolocation metadata 48 with respect to the geolocation data 50.

The processor-executable instructions may then cause the processor 70 to create for the geolocation-enabled computing device, a geo-location computing device accessible interactive visual representation of the predictive geo-relevant metadata 52. The geolocation-enabled computing device accessible interactive visual representation of the frequently used metadata 46 may be configured to be visually presented on the graphical user interface 54 of the geolocation-enabled computing device prior to the processor 70 being caused by the processor-executable instructions to transmit the geolocation-enabled computing device accessible interactive visual representation of the predictive geo-relevant metadata 52 to the geolocation-enabled computing device. It should be appreciated that although a particular architecture is presented in FIG. 2, the teachings presented herein include other architectures of DMS servers as well.

Figure 3:
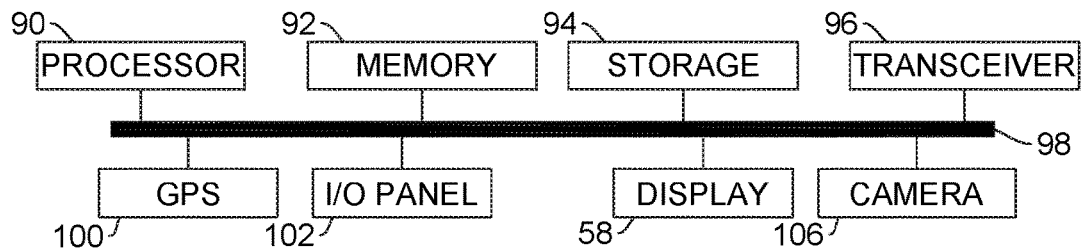
FIG. 3 is a schematic block diagram depicting one embodiment of a geolocation-enabled computing device shown in FIG. 1 in further detail.

Referring now to FIG. 3, a schematic block diagram is illustrated depicting the smart phone 24, as one embodiment of a geolocation-enabled computing device, in further detail. The smart phone 24 includes a processor 90, memory 92, storage 94, and transceiver 96 interconnected by a bus 98 in a common or distributed, for example, mounting architecture. A global positioning system (GPS) circuit 100, input/output panel 102, the display 58, and a camera 106 are also interconnected by the bus 98. The processor 90 may process instructions for execution within the smart phone 24, including instructions stored in the memory 92 or in the storage 94. The memory 92 stores information within the smart phone 24. In one implementation, the memory 92 is a volatile memory unit or units. In another implementation, the memory is a non-volatile memory unit or units. The storage 94 provides capacity that is capable of providing mass storage for the smart phone 24. The transceiver 96 sends and receives data on behalf of the smart phone 24. The GPS circuit 100 provides geolocation and time information via a global navigation satellite system, for example. The input/output panel 102 provides communication, including tactile and touch-based communication as well as microphone and speakers, to and from the smart phone 24. The display 58 presents the graphical user interface 54 and the display 58 may be partially or fully integrated with the input/output panel 102. The camera 106 provides an optical instrument for capturing or recording images.

As discussed, the memory 92 is accessible to the processor 90 and the memory 92 includes processor-executable instructions that, when executed, cause the processor 92 to prompt login information at the graphical user interface 54 and receive the login information at the graphical user interface 54. Thereafter, the instructions cause the processor 90 to transmit the user login information to the server 12 and receive the geolocation-enabled computing device accessible interactive visual representation from the server 12. The instructions cause the geolocation-enabled computing device accessible interactive visual representation to an interactive visual representation with the profile type presentation displayed as a graphical user interface 54 on the display panel, for example.

Thereafter the processor 90 is caused by the instructions to prompt user selection within the profile type presentation 56 at the graphical user interface 54 and receive the user selection within the profile type presentation 56 at the graphical user interface 54. The user selection may then be caused by the processor 90 executing processor-executable instructions to transmit the selection to the DMS server 12. It should be appreciated that although a particular architecture is presented in FIG. 3, the teachings presented herein include other smart phone architectures as well.

Figure 4:
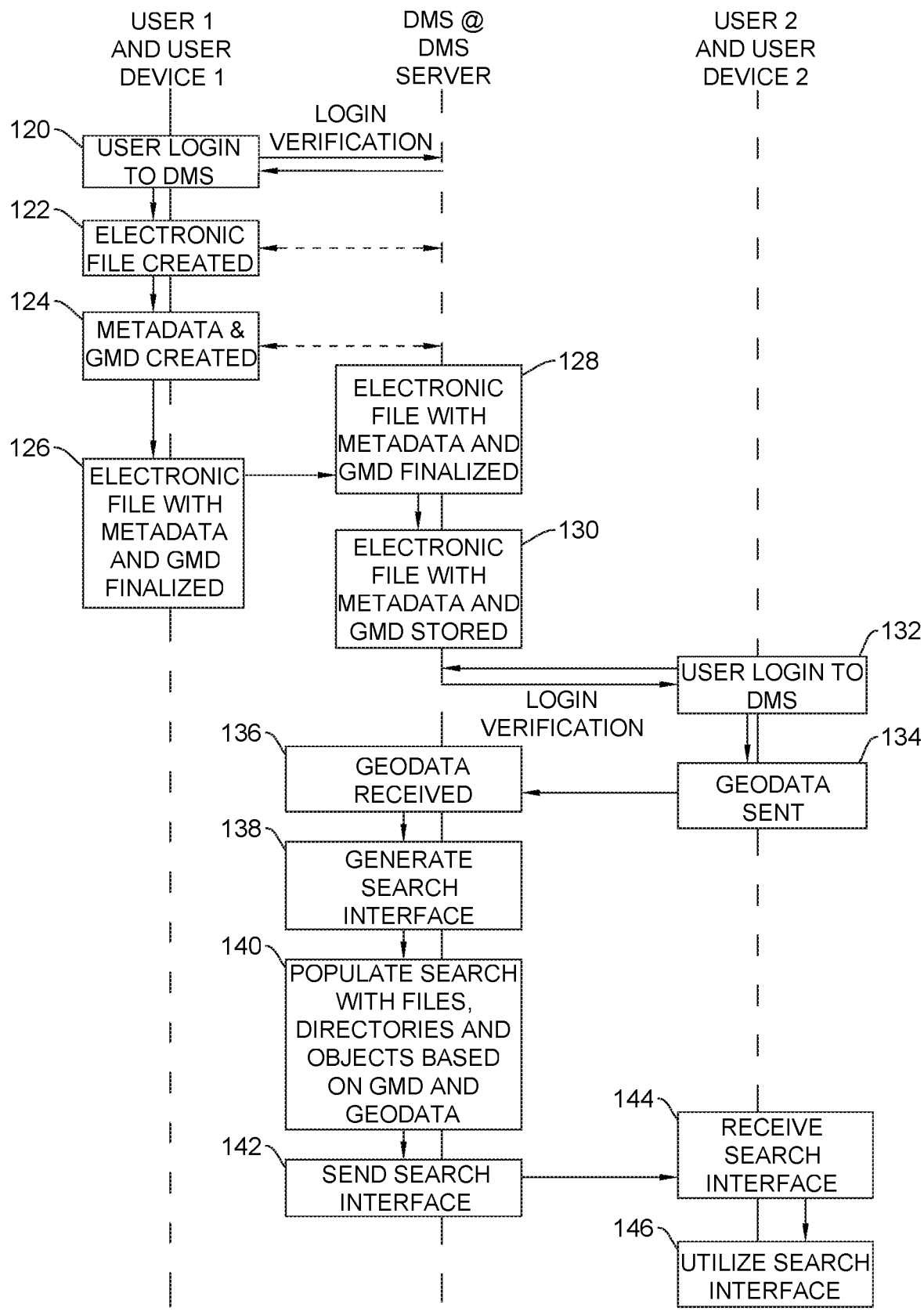
FIG. 4 is a diagrammatic representation of one embodiment of a workflow for executing a method for interactive visual representation of metadata within a networked heterogeneous workflow environment.

Referring now to FIG. 4, in one embodiment of a workflow for interactive visual representation of metadata within a networked heterogeneous workflow environment, the methodology involves multiple steps. At block 120, the user logins to the document management system and the login is verified at the document management system at the DMS server. At block 122, an electronic file is created by the user at the user's device. As part of the file creation, at block 124, metadata and geolocation metadata are created. As indicated by the dashed lines between blocks 122, 124 and the DMS at the DMS server, depending on the type of server deployment, the DMS and the DMS server may be employed during the file creation and the metadata and geolocation metadata creation. The electronic file along with the metadata and the geolocation metadata is finalized at blocks 126 and 128. Thereafter, the electronic file, the metadata, and the geolocation metadata are stored at the DMS at the DMS server at block 130.

The metadata and geolocation metadata may be actively created at block 124 where the user designates a portion or all of the metadata and geolocation metadata. This may involve saving a file and assigning complete metadata or heuristic favorites. Alternatively, at block 124 the metadata and geolocation metadata may be passively created by the DMS evaluating the metadata associated with the files. As previously discussed, the geolocation metadata may be information used to identify a subject physical location relevant to each file such as authors, audiences, topics, and copy. Addresses, cities, buildings, and places, for example, may also be utilized to identify the subject location.

At block 132, a second user, or the first user at a second time, logs into the DMS server with a second device, which is a geolocation-enabled computing device. At block 134, geolocation data is generated at the geolocation-enabled computing device and sent to the DMS at the DMS server, which receives the geolocation data at block 136. At block 138, the DMS at the DMS server generates a search interface and at block 140, the search interface is populated with files, directories, and objects, for example, based on a comparison of the geolocation metadata associated with files created by various users, or a subset thereof, and the location of the second user as represented by the geolocation data generated by the second user's device. At block 142, the search interface including predictive geo-relevant metadata is sent to the second user at the second device and received at the second device at block 144. At block 146, the second user may then interact with the search interface including predictive geo-relevant metadata.

Figure 5A:
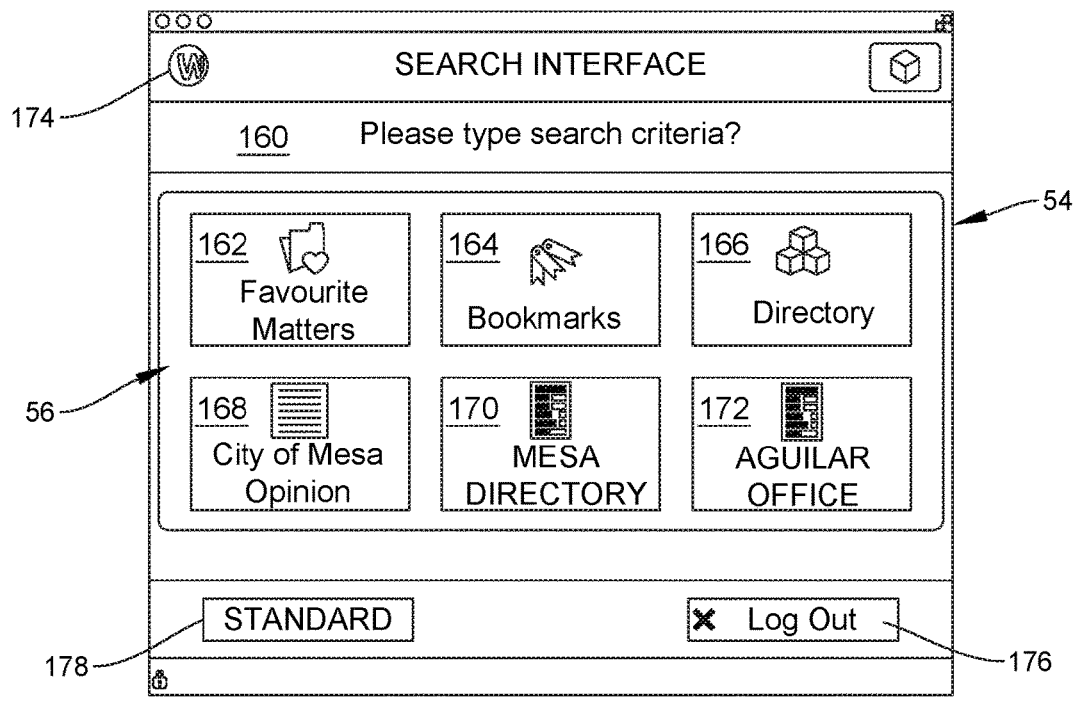
FIG. 5A and FIG. 5B are exemplary screenshots from an interface of the geolocation-enabled computing device of one embodiment of the interactive visual representation of metadata being utilized with predictive geo-relevant metadata.
Figure 5B:
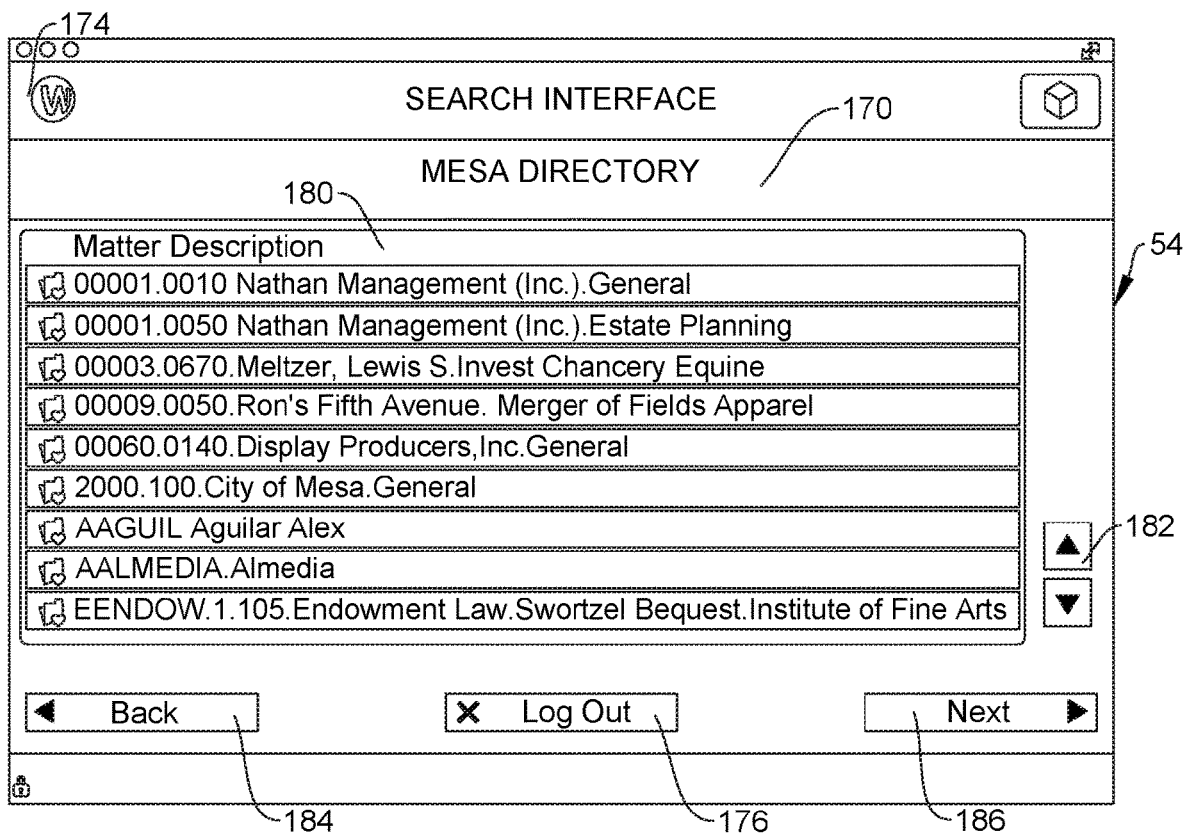

Referring now to FIG. 5A and FIG. 5B, which as mentioned, are exemplary screenshots from an interface of one embodiment of the interactive visual representation of predictive geo-relevant metadata 52 being utilized. More specifically, FIG. 5A depicts the graphical user interface 54 which is shown on the display of the geolocation-enabled computing device following a successful login by the user. As previously discussed, the user may be presented with options on the smart phone 24, for example, that predict geo-relevant files and metadata based on the location of the geolocation-enabled computing device and geolocation metadata of files associated with the document management server. As shown, the profile type presentation 56 includes a search interface favorite matters 160, a favorite matters folder 162, bookmarks 164, a directory 166, a City of Mesa opinion 168, a Mesa directory 170, and an Aguilar office directory 172. A home button 174 and a logout button 176 are also present. A standard button 178 removes the predictive geo-relevant metadata 52 functionality and provides a standard interface.

The user navigates the profile type presentation 56 and selects the appropriate metadata container or file; each curated based on predictive geo-relevant metadata. The favorite matters 160 container may include folders that have been most recently visited by the user that are curated based on the predictive geo-relevant metadata. The bookmarks 164 container may include matter locations saved by the user which are filtered or presented based on the predictive geo-relevant metadata. The directory 166 provides a logic tree presentation of all known files filtered by the predictive geo-relevant metadata. Similarly, the file 168 is the City of Mesa Opinion, which is the document that includes the most predictive geo-relevant metadata 52. The directory 170 includes the "Mesa Directory," which is the directory with the most predictive geo-relevant metadata. Lastly, the directory 172 includes the "Aguilar Office," which is the directory with the second most predictive geo-relevant metadata 52.

That is, a quickly accessible and interactive visual representation of the files and metadata associated with the DMS is created based on geolocation metadata 48 and geolocation data 50. The presentation may be in the form of a shortcut or icon logic tree that is associated with the geolocation information of the user at the relevant workflow computing device 14 by way of the DMS server 12.

Referring now to FIG. 5B, wherein the user selected the Mesa directory 170 and the files associated with the client Mesa are displayed including a file tree 180 with navigation buttons 182. The user may use the navigation buttons 182 to select the favorite matter from the file tree 180. A back button 184, logout button 176, and next button 186 are also presented.

The order of execution or performance of the methods and workflows illustrated and described herein is not essential, unless otherwise specified. That is, elements of the methods and workflows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for interactive visual representation of metadata within a networked heterogeneous workflow environment, the system comprising:
   a document management system (DMS) server configured to provide an enterprise environment having a document management system furnishing storage, versioning, metadata, security, indexing, and retrieval of a plurality of files having a plurality of users;
   the document management system (DMS) server including a processor, a memory, a storage, inputs, and outputs;
   a busing architecture communicatively interconnecting the processor, the memory, the storage, the inputs, and the outputs;
   the inputs and the outputs including a communication link to a plurality of computing devices associated with the plurality of users, at least one of the plurality of computing devices being a geolocation-enabled computing device having geolocation capability and a graphical user interface; and
   the memory accessible to the processor, the memory including processor-executable instructions that, when executed, cause the processor to:
   evaluate the metadata associated with the plurality of files based on geolocation metadata,
   create, based on the evaluation, the geolocation metadata associated with each of the plurality of files,
   receive a user login request from the geolocation-enabled computing device originated by a user at the geolocation-enabled computing device,
   receive geolocation data from the geolocation-enabled computing device,
   generate predictive geo-relevant metadata by referencing the geolocation data against the geolocation metadata, the predictive geo-relevant metadata being a subset of the geolocation metadata associated with the geo-location enabled computing device,
   create for the geolocation-enabled computing device a geo-location computing device accessible interactive visual representation of the predictive geo-relevant metadata, the geolocation-enabled computing device accessible interactive visual representation of the frequently-used metadata being configured to be visually presented on the graphical user interface of the geolocation-enabled computing device, and transmit the geolocation computing device accessible interactive visual representation of the predictive geo-relevant metadata.

2. The system as recited in claim 1, wherein the geolocation data further comprises information used to identify a physical location of the geo-location computing device.

3. The system as recited in claim 1, wherein the geolocation metadata further comprises information used to identify a subject physical location relevant to each file of the plurality of files.

4. The system as recited in claim 1, wherein the geolocation metadata further comprises information used to identify a subject physical location relevant to each file of the plurality of files, the subject physical location relating to file content information selected from the group consisting of authors, audiences, topics, and copy.

5. The system as recited in claim 1, wherein the geolocation metadata further comprises information used to identify a subject physical location relevant to each file of the plurality of files, the subject physical location relating to file location information selected from the group consisting of addresses, cities, buildings, and places.

6. The system as recited in claim 1, wherein the memory including processor-executable instructions to generate predictive geo-relevant metadata further comprise processor-executable instructions that, when executed, cause the processor to utilize a proximity threshold to compare the geolocation data and the geolocation metadata.

7. The system as recited in claim 1, wherein the memory including processor-executable instructions to generate predictive geo-relevant metadata further comprise processor-executable instructions that, when executed, cause the processor to utilize a proximity distance-based threshold to compare the geolocation data and the geolocation metadata to list all relevant files of the plurality of files having geolocation metadata within a specified distance from the geolocation data.

8. The system as recited in claim 1, wherein the memory including processor-executable instructions to generate predictive geo-relevant metadata further comprise processor-executable instructions that, when executed, cause the processor to utilize a proximity distance-based threshold to compare the geolocation data and the geolocation metadata to list a specified relevant files of the plurality of files having the closest geolocation metadata with respect to the geolocation data.

9. The system as recited in claim 1, the geolocation-enabled computing device accessible interactive visual representation of the predictive geo-relevant metadata further comprising a visual presentation including file names.

10. The system as recited in claim 1, the geolocation-enabled computing device accessible interactive visual representation of the predictive geo-relevant metadata further comprising a visual presentation including a directory structure.

11. The system as recited in claim 1, the geolocation-enabled computing device accessible interactive visual representation of the predictive geo-relevant metadata being visually presented in a profile type presentation on the graphical user interface of the geolocation-enabled computing device.

12. The system as recited in claim 11, wherein the profile type presentation further comprises containers selected from the group consisting of favorite matters, quick profiles, workspaces, bookmarks, and profile groups.

13. The system as recited in claim 1, wherein the geolocation-enabled computing device accessible interactive visual representation is extensible to the geolocation-enabled computing device via a software protocol.

14. The system as recited in claim 1, wherein the geolocation-enabled computing device is a third-party device with respect to the document management server.

15. The system as recited in claim 1, wherein the geolocation-enabled computing device further comprises a device selected from the group consisting of smart watches, smart phones, tablet computers, laptop computers, and desktop computers.

16. The system as recited in claim 1, wherein the geolocation capability further comprises a GPS circuit integral with the geolocation-enabled computing device.

17. A system for interactive visual representation of metadata within a networked heterogeneous workflow environment, the system comprising:
 a document management system (DMS) server configured to provide an enterprise environment having a document management system furnishing storage, versioning, metadata, security, indexing, and retrieval of a plurality of files having a plurality of users;
 the document management system (DMS) server including a processor, a memory, a storage, inputs, and outputs;
 a busing architecture communicatively interconnecting the processor, the memory, the storage, the inputs, and the outputs;
 the inputs and the outputs including a communication link to a plurality of computing devices associated with the plurality of users, at least one of the plurality of computing devices being a geolocation-enabled computing device having geolocation capability enabled by a GPS circuit and a graphical user interface; and
 the memory accessible to the processor, the memory including processor-executable instructions that, when executed, cause the processor to:
 evaluate the metadata associated with the plurality of files based on geolocation metadata,
 create, based on the evaluation, the geolocation metadata associated with each of the plurality of files, the geolocation metadata further comprises information used to identify a subject physical location relevant to each file of the plurality of files,
 receive a user login request from the geolocation-enabled computing device originated by a user at the geolocation-enabled computing device,
 receive geolocation data from the geolocation-enabled computing device, the geolocation data being information used to identify a physical location of the geolocation computing device,
 generate predictive geo-relevant metadata by referencing the geolocation data against the geolocation metadata by utilizing a proximity threshold to compare the geolocation data and the geolocation metadata, the predictive geo-relevant metadata being a subset of the geolocation metadata associated with the geo-location enabled computing device,
 create for the geolocation-enabled computing device a geo-location computing device accessible interactive visual representation of the predictive geo-relevant metadata, the geolocation-enabled computing device accessible interactive visual representation of the frequently-used metadata being configured to be visually presented on the graphical user interface of the geolocation-enabled computing device, and
 transmit the geo-location computing device accessible interactive visual representation of the predictive geo-relevant metadata.

18. The system as recited in claim 17, wherein the geolocation-enabled computing device further comprises a device selected from the group consisting of smart watches, smart phones, tablet computers, laptop computers, and desktop computers.

19. A system for interactive visual representation of metadata within a networked heterogeneous workflow environment, the system comprising:
 a document management system (DMS) server configured to provide an enterprise environment having a document management system furnishing storage, versioning, metadata, security, indexing, and retrieval of a plurality of files having a plurality of users;
 the document management system (DMS) server including a processor, a memory, a storage, inputs, and outputs;
 a busing architecture communicatively interconnecting the processor, the memory, the storage, the inputs, and the outputs;
 the inputs and the outputs including a communication link to a plurality of computing devices associated with the plurality of users, at least one of the plurality of computing devices being a geolocation-enabled computing device having geolocation capability and a graphical user interface; and
 the memory accessible to the processor, the memory including processor-executable instructions that, when executed, cause the processor to:
 evaluate the metadata associated with the plurality of files based on geolocation metadata,
 create, based on the evaluation, the geolocation metadata associated with each of the plurality of files,
 receive geolocation data from the geolocation-enabled computing device,
 generate predictive geo-relevant metadata by referencing the geolocation data against the geolocation metadata, the predictive geo-relevant metadata being a subset of the geolocation metadata associated with the geo-location enabled computing device,
 create for the geolocation-enabled computing device a geo-location computing device accessible interactive visual representation of the predictive geo-relevant metadata, the geolocation-enabled computing device accessible interactive visual representation of the predictive geo-relevant metadata being configured to be visually presented on the graphical user interface of the geolocation-enabled computing device.

20. The system as recited in claim 19, wherein the geolocation-enabled computing device further comprises a device selected from the group consisting of smart watches, smart phones, tablet computers, laptop computers, and desktop computers.

* * * * *